United States Patent [19]

Mead et al.

[11] Patent Number: 4,736,333
[45] Date of Patent: Apr. 5, 1988

[54] ELECTRONIC MUSICAL INSTRUMENT

[75] Inventors: Carver A. Mead; John C. Wawrzynek; Tzu-Mu Lin, all of Pasadena, Calif.

[73] Assignee: California Institute of Technology, Pasadena, Calif.

[21] Appl. No.: 524,545

[22] Filed: Aug. 15, 1983

[51] Int. Cl.$^4$ .......................... G06F 13/00; G06F 7/38; G06F 7/52; G10H 1/00
[52] U.S. Cl. .................... 364/736; 364/715; 364/757; 84/1.01
[58] Field of Search ............... 364/736, 715, 748, 749, 364/200 MS FILE, 900 MS FILE, 757–760; 84/1.01

[56] References Cited

U.S. PATENT DOCUMENTS

| | | | |
|---|---|---|---|
| 3,806,714 | 4/1974 | Otsuka et al. | 364/715 |
| 3,885,141 | 5/1975 | Kieburtz | 364/759 |
| 3,956,622 | 5/1976 | Lyon | 364/758 |
| 4,041,461 | 8/1977 | Kratz et al. | 364/200 |
| 4,065,808 | 12/1977 | Schomberg et al. | 364/200 |
| 4,194,425 | 3/1980 | Kitagawa | 84/1.01 |
| 4,257,099 | 3/1981 | Appelt | 364/200 |
| 4,327,418 | 4/1982 | Kishi | 364/715 |
| 4,398,176 | 8/1983 | Dargel et al. | 364/900 |
| 4,400,768 | 8/1983 | Tomlinson | 364/200 |
| 4,507,748 | 3/1985 | Cotton | 364/757 |

OTHER PUBLICATIONS

R. F. Lyon, Two's Complement Pipeline Multipliers, Concise Papers, IEEE Transactions on Communications, Apr. 1976, pp. 418–425.
R. K. Richards, Arithmetic Operations in Digital Computers, D. Van Nostrand Company, Inc., 1955, pp. 303–311.
Robert Steven Ledley, L. S. Rotolo, James Bruce Wilson, Digital Computer and Control Engineering, McGraw–Hill Book Co., Inc. 1960, pp. 256–262.
Richard F. Lyon, A Bit-Serial VLSI Architectural Methodology for Signal VLSI System Design Area, Xerox Palo Alto Research Center, 3333 Coyote Hill Road, Palo Alto, Calif. 94304, pp. 131–140.

Primary Examiner—Gary V. Harkcom
Assistant Examiner—Dale M. Shaw
Attorney, Agent, or Firm—Freilich, Hornbaker, Rosen & Fernandez

[57] ABSTRACT

An array of universal processing elements (UPEs) may be interconnected through a switching matrix in response to control words which are in turn produced by a programmed digital computer in response to commands from a keyboard or a data file, thereby routing the outputs of selected UPEs to other UPEs for further processing and/or combining a sound stream in digital form. The matrix is comprised of both local and global conductors, the local ones being available to selected groups of UPEs. Each UPE is implemented as a digital multiplier, preferably with pipelining, and each UPE is comprised of a plurality of stages, preferably implemented with an adder for computing the sum of a plus the Boolean logic function $[b \cdot m + d \cdot \overline{m}]$ and a multiplexer for forming the function $[b \cdot + d \cdot \overline{m}]$, where a, b, d and m are bits of the respective two's complement number A, B, D and M, whereby the entire array of stages in a UPE computes $A + [B \times M + D \times (1-M)]$.

12 Claims, 9 Drawing Sheets

ELECTRONIC MUSICAL INSTRUMENT

BACKGROUND OF THE INVENTION

This invention relates to an electronic musical instrument, and more particularly to a method and apparatus for generating electronic waveforms whose amplitudes and harmonic structure may vary with time.

In the past, signal generators for electronic organs and the like have used frequency dividers and filters with one or more oscillators to generate scales of musical notes. In some cases, phase-locked loops have been used as frequency multipliers to facilitate generating the desired tone intervals. Such signal generators have generally been limited to producing sinusoidal or sawtooth waveforms of a controlled amplitude. Alternatively, waveforms of other forms have been generated using waveform data stored as a table in a memory of a computer. While good tones have been produced, they lacked, for example, the facility for introducing attack in addition to carefully controlled harmonics for desired timbres in synthesizing musical sounds of particular instruments.

What is required is a system for generating with greater flexibility more varied waveforms under digital control which may be mixed in different ways in order to synthesize the sounds of such varied musical instruments as reed, wind and string, and to generate still other musical sounds distinct from known instruments.

SUMMARY OF THE INVENTION

In accordance with the present invention, an array of universal processing elements (UPEs) are interconnected by a switching matrix for selectively routing the outputs of selected UPEs to other UPEs for further processing and/or combining. The matrix is comprised of conductors, some being global conductors available for connection to all UPEs while others are local conductors available only for connection among assigned groups of UPEs. Still other means (local conductors or direct switches) are available for connections between adjacent UPEs.

Each UPE is implemented as a digital multiplier. In the preferred embodiment, each UPE is capable of computing $A+[(B\times M)+D(1-M)]$, where A is a serial input to be added to the product $B\times M$, B is the multiplier and M the multiplicand, and D is a coefficient which may have any value, including zero. If D is zero, the UPE computes $B\times M$, and adds it to A. If D is not zero, then instead of $B\times M$, the final result is $D+M(B-D)$ which may be added to A, the linear interpolation between D and B with M being the interpolation constant. In other embodiments, a more traditional multiplier computing $A+(B\times M)$ could be used, with only some sacrifice in flexibility.

The novel features of the invention are set forth with particularity in the appended claims. The invention will best be understood from the following description when read in connection with the accompanying drawings.

BRIEF DESCRIPTION OF THE DRAWINGS

FIG. 3b illustrates the time relationship between signals in the UPE of FIG. 3a.

FIG. 4 illustrates a symbol for the UPE shown in FIG. 3a.

DESCRIPTION OF PREFERRED EMBODIMENTS

Figure 1:
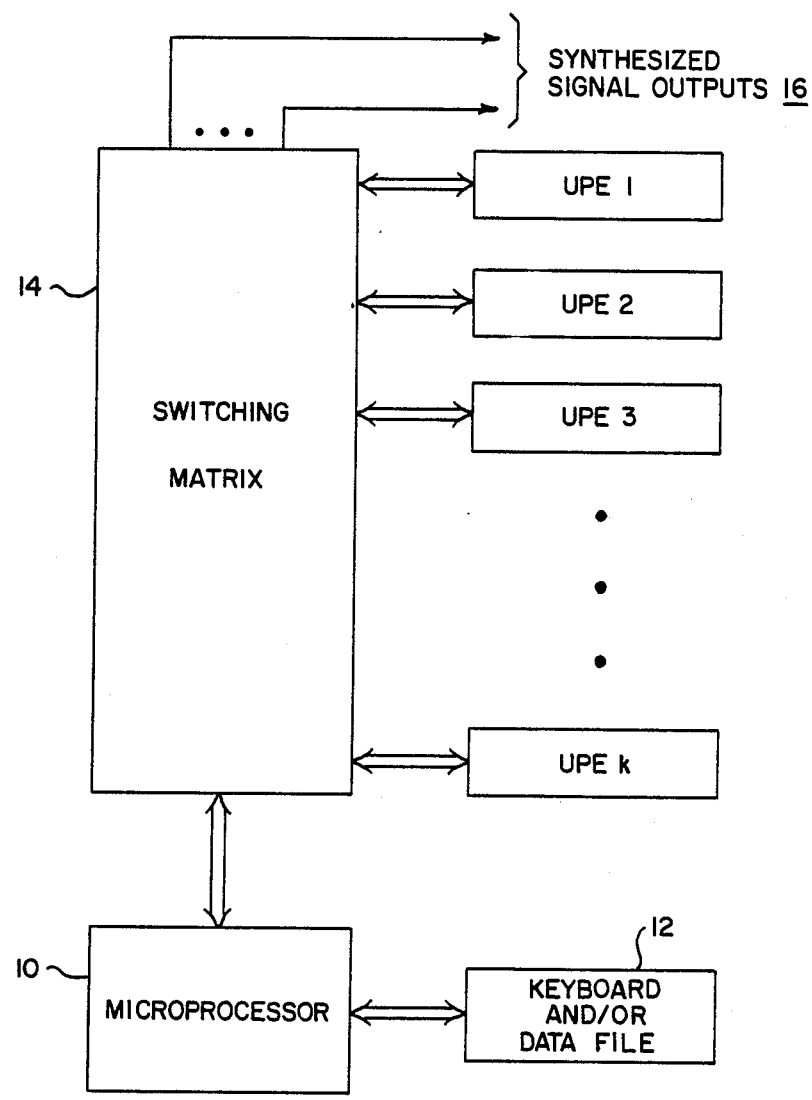
FIG. 1 is a schematic diagram of the architecture for interconnecting an array of UPEs as desired through a matrix, with connections to the UPEs used as required for input signals from global conductors, or from other UPEs, and to transmit output signals from selected UPEs to other UPEs, or to output conductors, all under control of a programmed microprocessor, which in turn is controlled by a user at a keyboard or commands stored in a data file.

Referring now to FIG. 1, it shows the general architecture of the present invention, which is a synchronous digital system for synthesizing musical sounds. The system is comprised of a plurality of universal processing elements (UPEs) 1, 2, 3 . . . k controlled by a programmed unit 10, shown as a synchronous microprocessor, in response to commands from an input unit 12, shown as a keyboard and/or a data file. The UPEs are controlled by the microprocessor through a switching matrix 14. Synthesized signal outputs appear at one or more of a plurality of conductors 16 extending out from the switching matrix. The nature of each signal appearing on any given conductor during any given time interval is a function of how one or more UPEs are interconnected and loaded with coefficients by the microprocessor through the switching matrix.

Figure 2:
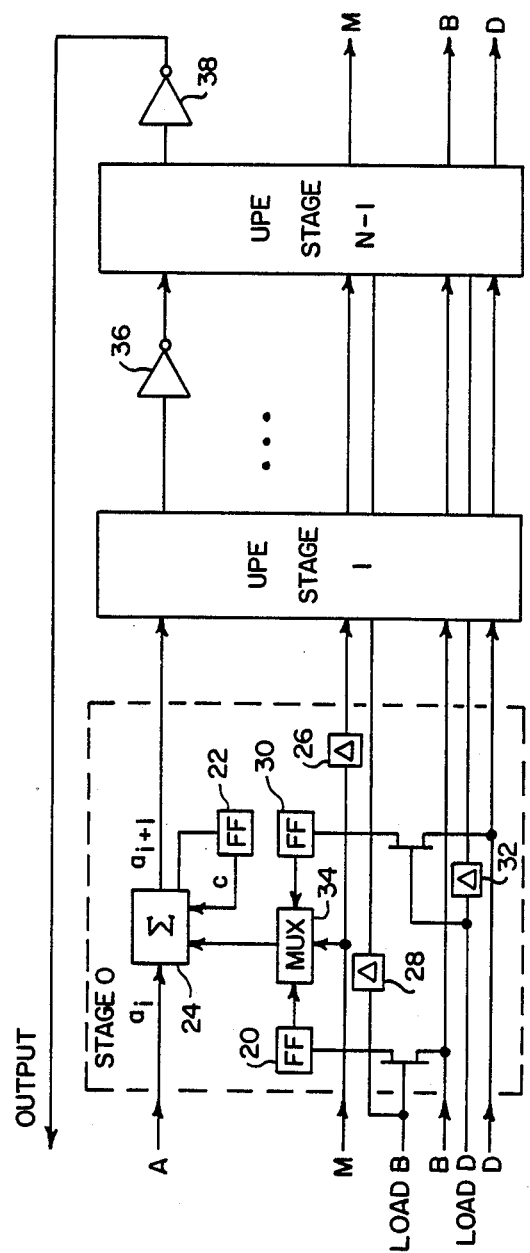
FIG. 2 is a diagram of one UPE showing an exemplary embodiment for each stage thereof.

Each UPE consists of a plurality of stages 0, 1, . . . N−1, as shown in FIG. 2. There is one simple stage for each bit in a multiplier word, B, applied as an input to the UPE. That multiplier is stored (in inverse order) in a register consisting of flip-flops, such as a flip-flop 20 for stage 0.

Each simple stage contains an AND function for one bit of multiplication, a flip-flop 22 for one bit of storage for the carry, and a three input adder 24 to sum the output of the preceding stage (or the input A in the case of the first stage) with the one bit multiply and the carry from the last one bit multiply. The output of the adder, $a_{i+1}$, contributes along with the result from all of the other stages to one bit in the final output $A+(M\times B)$.

The multiplicand M is passed through all stages of the multiplier, one bit at a time. A delay element 26, which may be a stage of a shift register, delays the multiplier bit being transferred from one stage to the next, one bit at a time. The multiplier B is loaded serially as the multiplicand M is passed through the multiplier one bit at a time, using a delay element 28 to delay the load B clock pulse as the binary digits are entered in the register comprised of flip-flops 20 in each stage. Similarly, another coefficient, D, is stored in a register comprised of a flip-flop 30 in each stage using delay elements 32 in each stage.

The AND function is implemented with a multiplexer 34 which chooses the input to the adder 24 between a bit of the stored word B and a bit of the stored word D. The multiplexer 34 is controlled by the multiplicand M so that each stage computes $b\cdot m + d\cdot \overline{m}$ and the entire array computes $A+[B\times M+D(1-M)]$. If the word D is zero, then each of the multiplexers effectively performs as an AND gate, with each stage computing $b\cdot m$, and the entire array of UPE stages computing $A+[B\times M]$. If the word D is not zero, the final result is the linear interpolation between D and B, with M being the interpolation constant, i.e., the result equals $A+[D+M\times(B-D)]$.

As noted hereinbefore, the multiplier B is stored in the multiplier register in inverse order, that is with bit $b_0$ in stage O, bit $b_1$ in stage 1, and so on, by placing the multiplier on the B input line one bit at a time, as a load control pulse is passed from stage to stage. As each stage receives the load pulse, it loads its flip-flop with the current bit on the B input line. The D input is loaded into its separate register in the same manner when it is required. The multiplicand M is not stored in a register, but is delayed one bit cycle in each stage so that it can flow through and be operated by each bit of the multiplier B, one bit at a time. Thus, as the multiplier B is being loaded, it is possible to begin passing the multiplicand M into the array of stages and perform the first 32 bits of multiplication.

In the course of the multiplication operation, each bit of the final result is formed by every stage adding its result to the result from the previous stage, and passing it on. Consequently, there is a propagation delay for each bit of the final result proportional to the number of stages. This delay can be avoided by using a conventional pipelining technique which consists of the addition of an extra bittime delay element on the $a_{i+1}$ line, and on every one of the lines which connects from one stage to the next. These extra delay elements are not shown in FIG. 2 to simplify the diagram.

The advantage of pipelining is that propagation delay for the array is proportional only to the delay in one stage, and not to the number of stages, although it does cause an initial delay through the pipeline. However, if the data being processed is a continuous stream, as contemplated by the present invention, this initial delay proportional to the total number of stages must only be suffered once at the beginning of the stream. Consequently, pipelining is a technique that is recommended for a preferred embodiment of the invention.

Figure 3A:
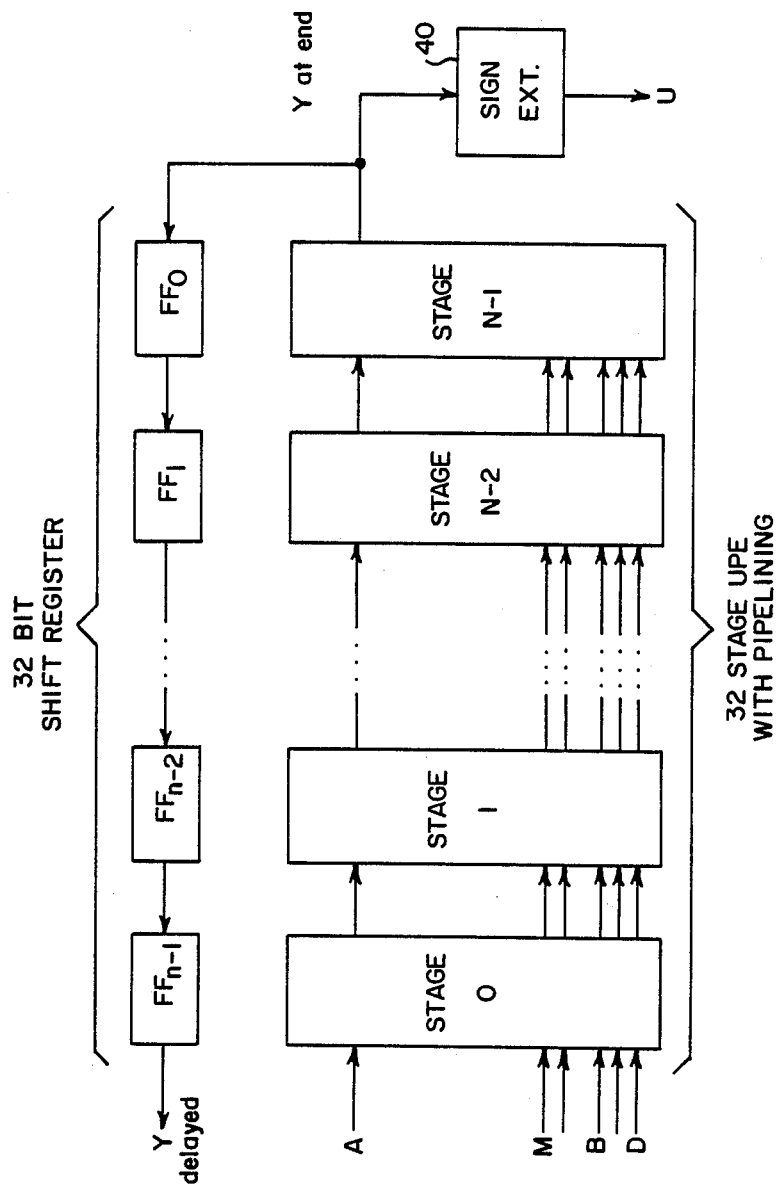
FIG. 3a is a diagram of a variation in the architecture of one UPE for the purpose of generating from the primary output y having 2n bits a secondary output having only n bits, where n is chosen to be 32 in the exemplary embodiment of the invention.
Figure 3B:
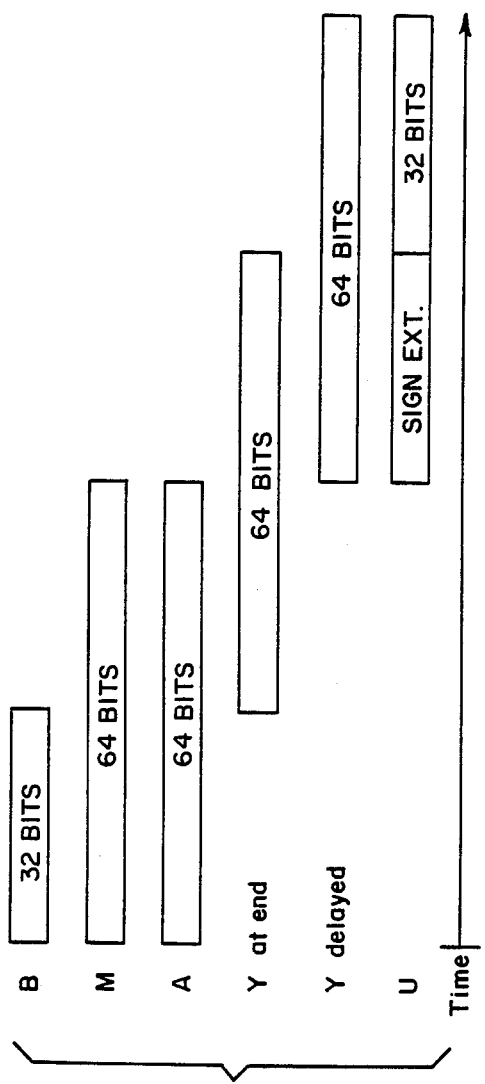

FIG. 3a illustrates the preferred architecture used in each UPE. It contains n pipelined stages (0 through $N-1$), along with the same number of stages of a shift register, shown as flip-flops $FF_0$, $FF_1$ ... $FF_{n-1}$, where n is chosen to be, for example, 32. The end result Y at the output of the 32 stages is fed into a sign extension circuit 40 which generates a U output by passing only the most significant 32 bits of the Y output, and then extending its sign bit over the next 32 bit cycles. Because the Y output is the product of two 32-bit numbers, it consists of 64 bits. Consequently, the first 32 bits of that product not used for the U output are stored in the 32-bit shift register. Since the Y output is thus delayed by 32-bit cycles, both the Y output and the U output appear in synchronism, as shown in FIG. 3b. It should be noted that the entire system of FIG. 1 is synchronized by clock pulses (not shown), and preferably by the clock pulses used for the synchronous microprocessor.

The B input and the D input (not shown), are 32-bit two's complement numbers, and M and A are 64-bit two's complement numbers. However, it should be understood that the bit serial architecture implemented to perform multiplication and linear interpolation does not depend upon use of the two's complement. The two's complement representation is chosen only because it is more efficient.

A modification to the array of stages is necessary to accommodate two's complement numbers. Any two's complement number with binary point to the immediate right of the sign bit can be written as:

$$\sum_{i=0}^{n-1} b_1 \cdot 2^{i-n+1} - b_{n-1}$$

Since each stage of the multiplier holds one bit of the word B, with stage $n-1$ holding $b_{n-1}$, the last stage must perform a subtraction of the incoming signal instead of an addition as in the other stages. The last stage is implemented with an inverter 36 on the incoming partial product a along with an inverter 38 on its output as shown in FIG. 2. A two's complement number at the M input must be sign extended to guarantee correct operation. For example, if M is a 32-bit number then after all 32 bits of M have been fed in, an additional 32 bits, each a copy of the sign bit, must follow.

Another advantage to using the two's complement is that it facilitates the computation of linear interpolations with the same efficiency as multiplication. This is made possible by the fact that, if the multiplicand M is a positive fraction and is represented by .xxxxx then one's complement $\overline{M} \approx 1 - M$. It is this fact that is employed in implementing the AND function required for the one bit multiplication in each stage by a multiplexer (MUX) 34, as shown in FIG. 2. It should be recalled that the MUX is controlled by the multiplicand M to choose between the two signals B and D.

The last point that should be noted about the basic architecture of the UPE is that each stage receives its input from the previous stage. The first stage (stage 0) has no previous stage and therefore takes its inputs from the switching matrix 14 shown in FIG. 1. The input a for stage 0 need not be 0 in which case a number A is added to the final result.

Figure 4:
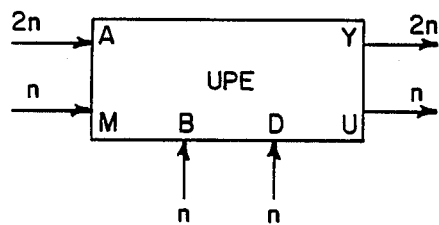

Before describing typical applications of the UPEs with various examples, a symbol to be used for a UPE with pipelining implemented as described with reference to FIG. 3a will first be described with reference to FIG. 4. It consists of a rectangle with the four inputs A, M, B and D, and the two outputs Y and U. The M, B and D inputs and the U output are 32-bit two's complement numbers between 2 and −2, which are sign extended to 64 bits in the case of M and U, as follows:

sign bits xx.xx . . . x

The A input and the Y output are two's complement numbers between 4 and −4, as follows:

xxx.xxx . . . x

These two types of numbers restrict the way several UPEs may be interconnected. The type of any output which feeds an input must match.

To use the UPE as a simple multiplier, inputs A and D are set to zero, and the multiplicand and multiplier are fed into the respective M and B input terminals.

Figure 5:
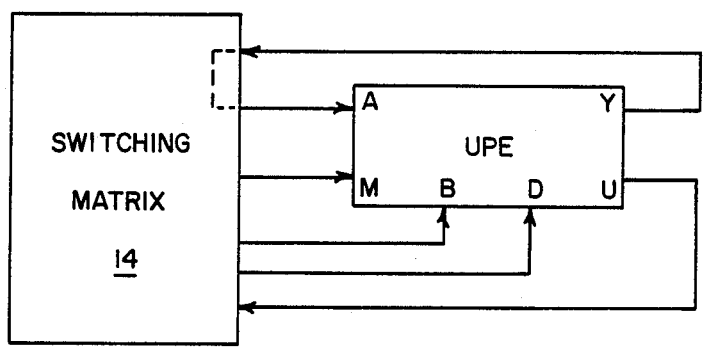
FIG. 5 illustrates the use of a single UPE as an integrator.

A single UPE can function as an integrator by connecting its output back into its A input through the switching matrix 14, as shown in FIG. 5. This forms a running sum of the result from the inputs M, B and D. Such a running sum signal would seldom be used as such. Instead, it would be used as an input to one or more other UPEs through the switching matrix. It is the output of such other UPEs, combined as desired, that will then form a synthesized musical sound.

Figure 6:
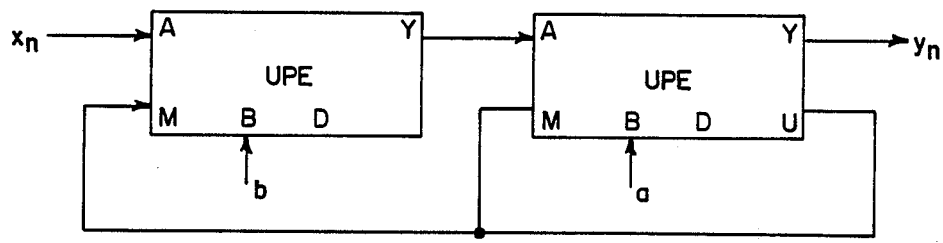
FIG. 6 illustrates the use of two UPEs to form a two-pole recursive filter.

Another typical application is the use of two UPEs to provide a filter, as shown in FIG. 6. The basic operation associated with a filter pole is one multiplication and one addition. Therefore a single UPE can implement a single pole filter, and two UPEs can implement a two pole filter.

Figure 7:
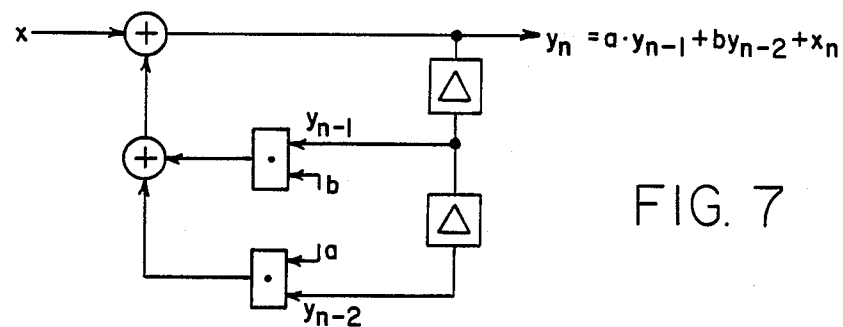
FIG. 7 illustrates a flow chart of arithmetic operations required for a two-pole recursive filter.

FIG. 7 shows a flow chart of arithemetic operations necessary for a two pole recursive digital filter which realizes the equation:

$$y_n = b \cdot y_{n-1} + a \cdot y_{n-2} + x_n \quad (1)$$

To form the new output $y_n$, the input $x_n$ is added to the sum of the product of the last output $y_{n-1}$ and a constant, a, and the next to the last output $y_{n-2}$ times a constant b. FIG. 7 uses conventional symbols for the delay elements (rectangles with a Greek letter, $\Delta$), rectangles with a dot for multipliers forming the products, and circles with a plus sign for forming the sums. FIG. 6 shows how the equivalent of this two pole recursive filter can be implemented with two UPEs. Each UPE takes the place of an adder, a multiplier, and a delay element.

In terms of the delay operator Z, one UPE implements: $(A+B \cdot M)Z$. The combination of two UPEs connected as shown in FIG. 6 implements:

$$y = [(x + b \cdot y)Z + a \cdot y]Z \quad (2)$$
$$= xZ^2 + a \cdot yZ^2 + b \cdot yZ,$$

which is, $$y_n = b \cdot y_{n-1} + a \cdot y_{n-2} + x_{n-2} \quad (3)$$

Equation (4) provides the function of Equation (2) delayed two bit times.

Figure 8:
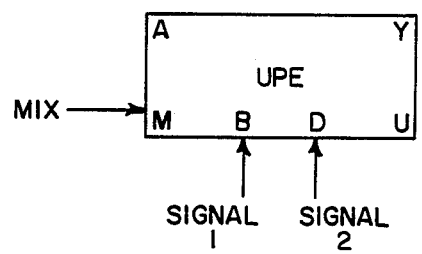
FIG. 8 illustrates the use of one UPE to mix two signals, with the balance of the mix controlled by a third signal.

Another application of the present invention is in mixing of signals. FIG. 8 illustrates how a single UPE can be used to mix two signals with the M input controlling the balance of the mix through the multiplexers of the stages.

Figure 9:
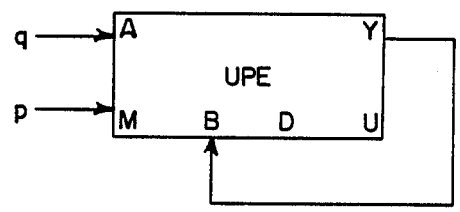
FIG. 9 illustrates the use of one UPE as a random noise generator.

Noise generation is very important for the synthesis of interesting musical sounds. A pseudorandom signal generator can be constructed with one UPE as shown in FIG. 9. This uses a linear congruence method implementing:

$$x_i = p \cdot x_{i-1} \bmod r + q \quad (4)$$

where $r = 2^{32}$. The mod operation is achieved by feeding the 64 bit Y output of the UPE into the 32 bit input B. Only the least significant 32 bits of Y are ever loaded, which is effectively mod $2^{32}$.

Figure 10:
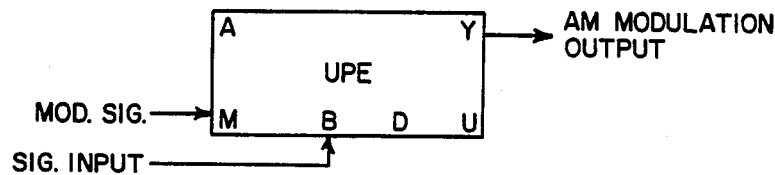
FIG. 10 illustrates the use of one UPE for modulating an input signal with another signal.
Figure 11:
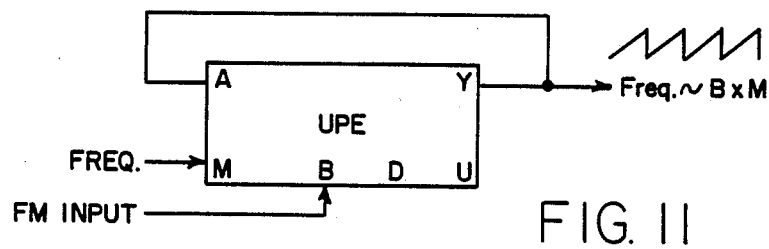
FIG. 11 illustrates the use of the modulator of FIG. 10 as a sawtooth waveform generator.

FIG. 10 illustrates the use of one UPE for modulating an input signal with a modulation signal. By connecting the Y output to the A input, and introducing a frequency control value at the M input and an FM control value at the B input, as shown in FIG. 11, the modulator of FIG. 10 becomes a simple sawtooth oscillator operating at a frequency proportional to B times M.

Figure 12:
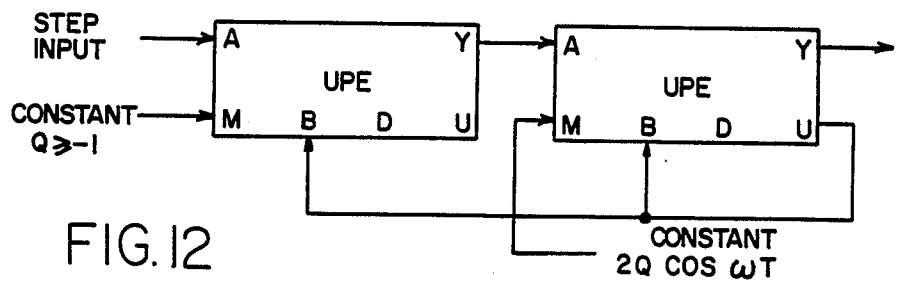
FIG. 12 illustrates the use of two UPEs to synthesize a sinusoidal waveform generator.

FIG. 12 illustrates a sinusoidal oscillator implemented with two UPEs. The multiplier B to each UPE is the output U of the second UPE, and the multiplicand M of the second UPE is the constant $2Q \cos \omega T$. The multiplicand M of the first UPE is a coefficient Q equal to or greater than −1, while that of the second UPE is set equal to $2Q \cos \omega T$, where T is the sample period, to define the frequency of the sinusoidal taken from the output Y of the second UPE. The input A to the second UPE is the output Y of the first UPE, and the input A of the first UPE is simply a constant provided by the microprocessor 10 through the switching matrix 14 which provides this arrangement of the UPEs. If the multiplicand M of the first UPE is a value Q equal to minus one, this arrangement of UPEs will oscillate indefinitely, and if equal to greater than −1, the oscillation initiated by the constant A will damp out with a damping time $Z_{damp} \approx 1/(Q+1)$. The frequency of the oscillator can be modulated by varying the coefficient B of the second UPE as a function of time.

Figure 13:
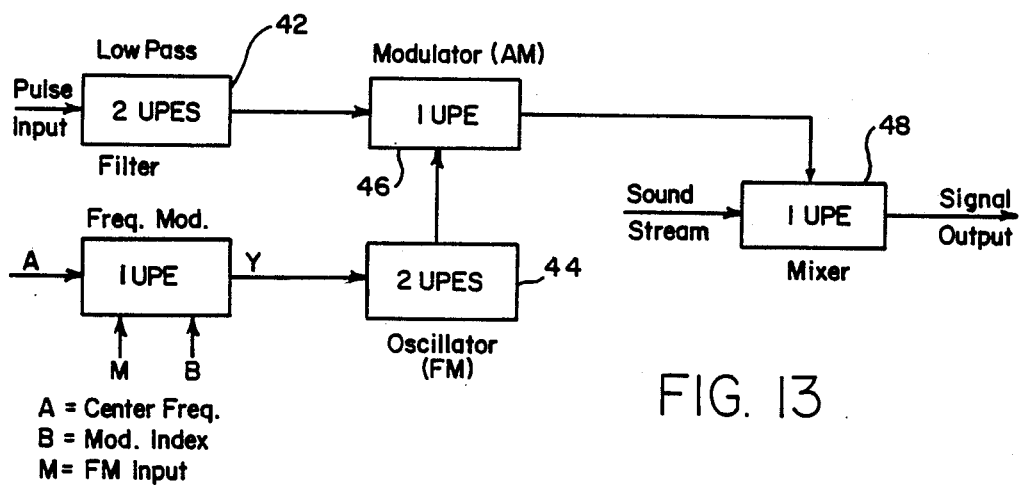
FIG. 13 illustrates the manner in which various applications of UPEs may be combined to add sound to a sound system.

FIG. 13 illustrates how a typical instrument may be implemented by interconnecting UPEs through the switching matrix using 2 UPEs for a low-pass filter 42, which receives a command pulse from the microprocessor to start and then stop a note. The low-pass filter operates on the pulse to provide a signal that increases rapidly, and decays slowly. This signal is used to control the attack of the sound to be synthesized. Two UPEs are used to implement a frequency modulated oscillator 44, and one UPE is used to implement an amplitude modulator 46 where the frequency modulated output of the oscillator is amplitude modulated by the attack signal from the filter 42. A single UPE 47 is used as a frequency modulator to generate a frequency modulated (FM) input to the oscillator 44. Its input A is the center frequency, and the other inputs B and M are, respectively, the modulation index desired, and an FM output from another oscillator. The output of the amplitude modulator 46 is then mixed with a sound stream using a single UPE 48 as a mixer.

Figure 14:
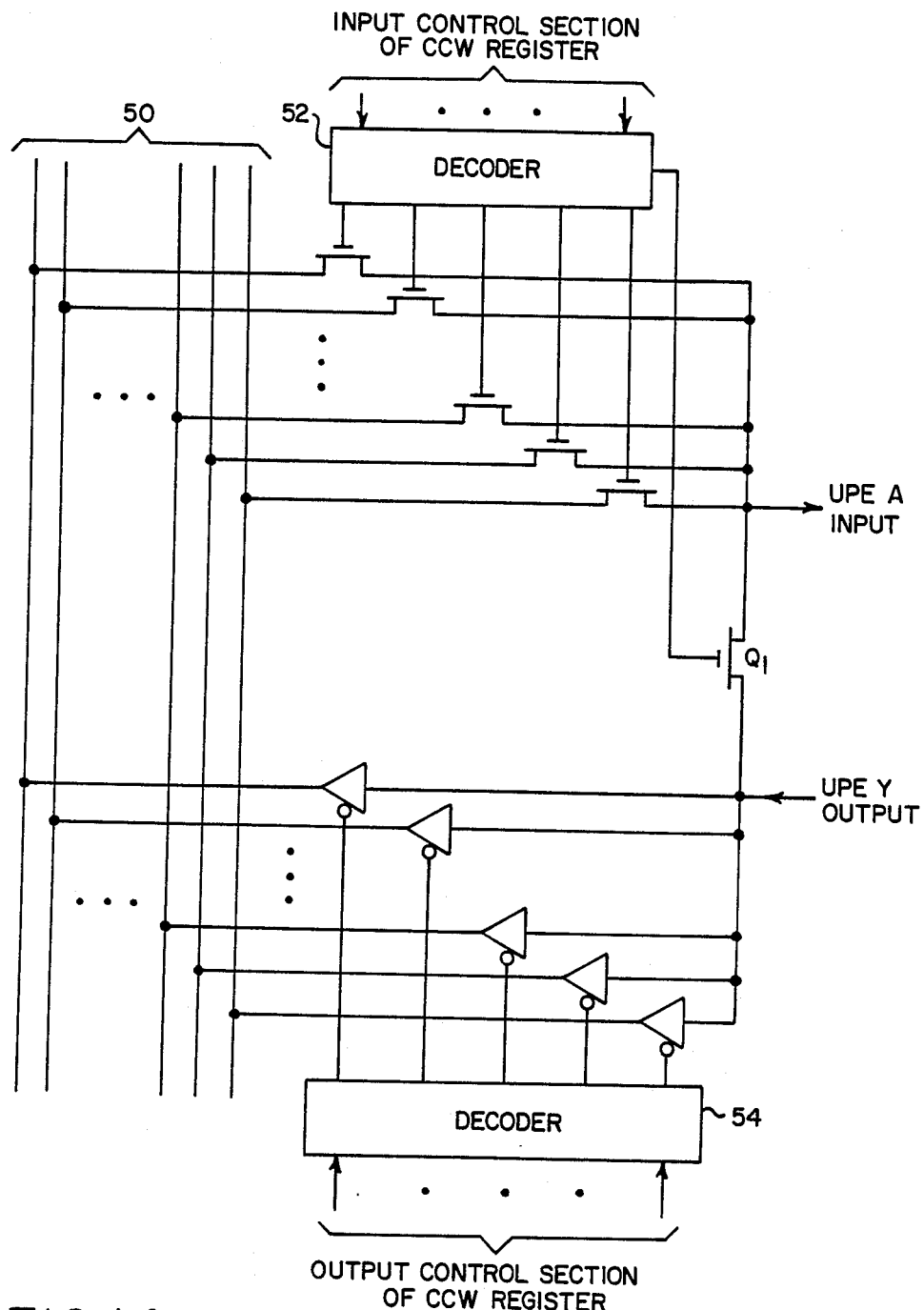
FIG. 14 illustrates the manner in which the switching matrix shown in FIG. 1 may interconnect UPE input and output terminals to signal distribution conductors.

FIG. 14 illustrates the manner in which a given UPE is connected by the switching matrix shown in FIG. 1 to receive an input signal at its A input from any one of a plurality of conductors 50, some being available for connection to all UPEs while others are available only for connection to adjacent UPEs. Still other conductors are available for connection to assigned groups of UPEs. An input section of a communication register receives a byte of a communication control word (CCW) from the microprocessor 10 (FIG. 1). That byte is decoded in a decoder 52 to enable one of a plurality of MOSFET gates selected to connect a particular conductor of the matrix to the UPE A input. One of the gates $Q_1$ can connect the UPE Y output to the A input directly, for such an application as described with reference to FIG. 5. Similarly, an output section of the communication control register receives a byte of the CCW from the microprocessor which is decoded in a decoder 54 to enable one of a plurality of amplifiers selected to connect the Y output of the UPE to a particular one of the conductors 50. There are thus two decoders and a communication control register for each UPE. One communication control register may serve a group of UPEs. In that case, separate input and output control sections of the register are assigned to the respective UPEs.

Although only the switching matrix for the A input and Y output have been shown in FIG. 14, it should be understood that all inputs and all outputs, which may include inputs M, B and D as shown in FIG. 2 and output U shown in FIG. 3a, are capable of being switched in the same way by other sections of the switching matrix. In that manner, A, M, B and D of each UPE can be taken from one of its own outputs, or from any of the conductors in the matrix adjacent to it. The outputs of the UPE can drive any conductors selected in the matrix. The source of each input and the destination of each output is selected by a communication control word. Associated with each UPE are sections of a CCW register which determine the source of all of its inputs and the destination of all of its outputs.

Figure 15:
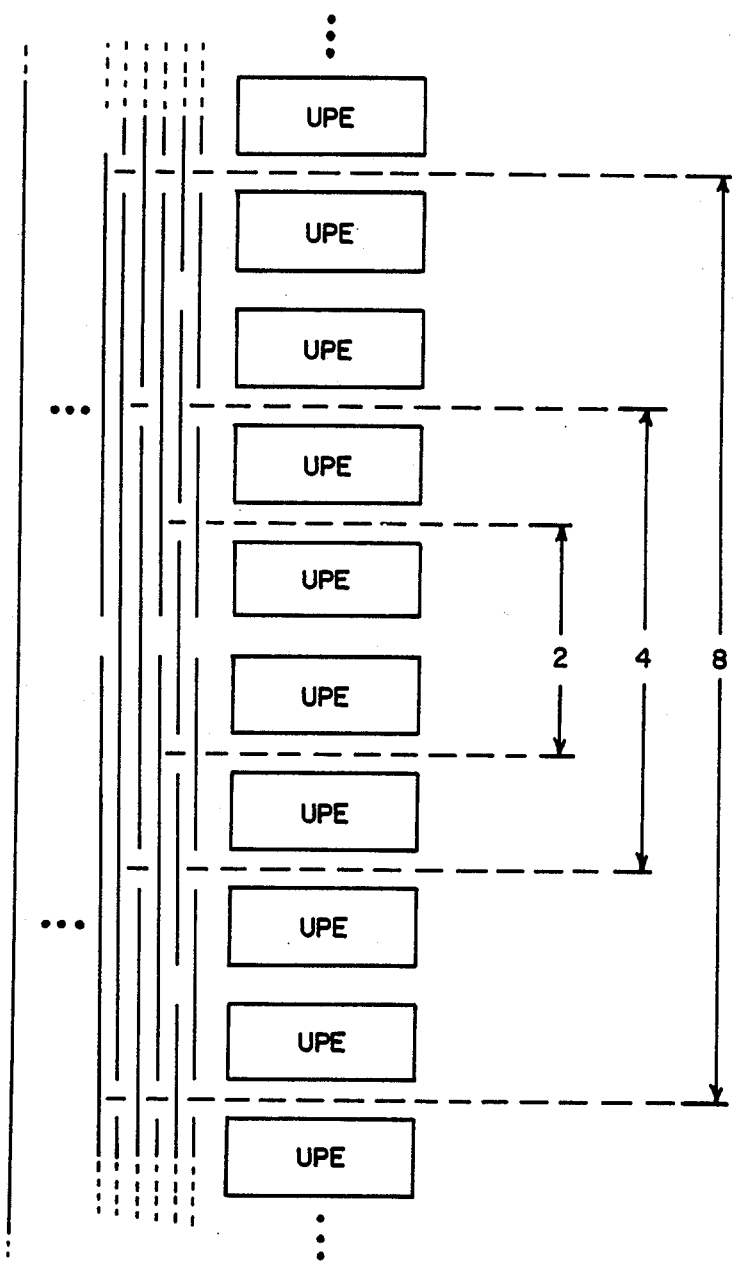
FIG. 15 illustrates schematically the manner in which six input and output terminals of each UPE in an array are associated through conductors of a switching matrix in different groups of two, four, eight or more, as well as global conductors.

The conductors 50 shown in FIG. 14 for one UPE are arrays of conductors shown in FIG. 15 wherein some on the right are shared by adjacent UPE's, while others shown next to the left are shared by staggered groups of two, and others shown next to the left are shared by groups of four while still others to the left are shared by staggered groups of four. Arrays of still longer conductors may be provided next which are shared by groups of eight UPEs, and then 16 or more UPEs, if desired, and staggered groups of eight and sixteen or more UPEs followed by global conductors, i.e., conductors shared by all UPEs of the array. All are normally provided on one VLSI chip. Each conductor shown in FIG. 15 is typically an array of several conductors. Each array of conductors is provided with switches and logic for selectively turning on switches as described with reference to FIG. 14 for one UPE. VLSI technology makes it economically feasible to provide such arrays of conductors, switches and switching logic on a single chip.

The very large scale integrated circuit (VLSI) chip on which the array of UPEs is located is equipped with a bus from which the contents of any of the registers in the UPEs or any CCW register can be loaded. This bus is driven from the microprocessor or other control computer located off the VLSI chip. In a typical system, many VLSI chips are connected in such a way that the same data stream representing the sound being generated is threaded through all of them, while the control bus for each VLSI chip is controlled directly from the microprocessor. In this way, an enormous number of selected operations can be performed on each sound. The selection is made by the programmed microprocessor in response to a command from the keyboard, which may simulate the keyboard of a piano, organ, or other instrument, or a composite of instruments normally found in an orchestra. Alternatively, the microprocessor may play back a set of operations stored in a data file as commands in the proper sequence for the sound desired. The only operations required by the control computer are loading communication control words and inputs M, B and D. The A input will normally be the sound data stream, although that need not always be the case, and in some applications using one or more UPEs, the A input may be a coefficient provided by the microprocessor in the same way as the M, B and D inputs.

VLSI technology makes this switching matrix economically feasible. Part of the matrix also provided in the VLSI chip is the addressing logic required to store the instructions in the appropriate register and route the load control pulses. Addressing logic may be implemented in a manner analogous to that for addressing solid state memory. Routing load control signals is implemented in a manner analogous to that for controlling a group of input/output devices from a microprocessor.

Although the exemplary embodiment of the universal processing elements disclosed herein is based on the conventional binary system using two's complement numbers, this number system is not the only possible one. Other number systems may be employed, such as the residue number system which alleviates the carry problem inherent in the conventional binary system. Still other number systems may be feasible for the synthesis of musical sound using UPEs and a switching matrix which allows inputs and outputs of the UPEs to be interconnected in discretionary configurations specified by CCWs generated by a microprocessor in response to command signals from a keyboard or other command signal generator. Consequently, it should be recognized that modifications and equivalents may readily occur to those skilled in the art, particularly in the selection of number systems and multiplier configurations. It is therefore intended that the claims be interpreted to cover such modifications and equivalents.

What is claimed is:

1. A digital very large scale integrated system for generating electronic waveforms useful in synthesizing sound comprising an array of bit serial processing elements on a chip, each element comprising a digital multiplier, a switching matrix for point to point connection of data between pairs of processing elements wherein each pair may be selected from any two processing elements in said array to allow inputs and output of said elements to be interconnected in discretionary configurations specified by control bits in a communication control word, said switching matrix comprising an array of parallel conductors on said chip including sets of conductors for interconnecting between groups of $2^n$ elements, where n is an integer is equal to or greater than one that increases in increments of 1 until $2^n$ reaches the total number of elements on the chip, a programmed digital computer for producing communication control words in response to control command signals, and means for generating said command signals, whereby concurrent communication between processing elements is made possible to implement algorithms.

2. A digital system as defined in claim 1 wherein said digital multiplier is comprised of a plurality of stages connected in series for bit serial multiplication of two numbers, logic means for one bit multiplication of a multiplicand M by a multiplier B, means for storing a carry, C, a three input adder for producing a one bit result $a_{i+1}$ and a carry by adding the result of the one bit multiplier logic means with the carry from the last bit result and the result $a_i$ from a preceding stage, or an input A in the case of the first stage which may be any number including zero.

3. A digital system as defined in claim 2 including means in each stage for storing one bit of said multiplier, B, as said multiplier is entered serially with each multiplier bit of successively higher order stored in a separate stage of higher order, and means for delaying said multiplicand, M, one bit in each stage as said multiplier is passed serially through said stages to perform the multiplication operation serially, each multiplicand bit being multiplied by every multiplier bit in sequence, and the results of the multiplications in each stage are added to the results of its preceding stage.

4. A digital system for generating electronic waveforms useful in synthesizing sound comprising an array of bit serial processing elements, each element comprising a digital multiplier, a switching matrix for point to point connection of data between pairs of processing elements wherein each pair may be selected from any two processing elements in said array to allow inputs and output of said elements to be interconnected in discretionary configurations specified by control bits in a communication control word, a programmed digital computer for producing communication control words in response to control command signals, and means for generating said command signals, wherein said digital multiplier is comprised of a plurality of stages connected in series for bit serial multiplication of two numbers, logic means for one bit multiplication of a multiplicand M by a multiplier B, means for storing a carry, C, a three input adder for producing a one bit result $a_i+1$ and a carry by adding the result of the one bit multiplier logic means with the carry from the last bit result and the result $a_i$ from a preceding stage, or input A in the case of the first stage which may be any number including zero, and including means in each stage for storing one bit of said multiplier, B, as said multiplier is entered serially with each multiplier bit of successively higher order stored in a separate stage of higher order, and means for delaying said multiplicand, M, one bit in each stage as said multiplier is passed serially through said stages to perform the multiplication operation serially, each multiplicand bit being multiplied by every multiplier bit in sequence, and the results of the multiplications in each stage are added to the results of its preceding stage, wherein the last stage is coupled to its preceding stage by an inverter, and the end result Y is coupled out of the last stage through an inverter to accommodate two's complement numbers for the multiplier B, multiplicand M and result Y.

5. A digital system as defined in claim 4 wherein said logic means in each stage for one bit multiplication is comprised of a multiplexer controlled by a bit of said multiplicand, M, to select as an input to said adder a bit of said multiplier, B, or a bit of another number, D, and including means in each stage for storing one bit of said other number as said other number is entered serially with each multiplier bit of successively higher order stored in a stage of higher order, whereby linear interpolations between said multiplier and said other number is carried out with the same efficiency as multiplication with said multiplicand being the interpolation constant.

6. A digital system as defined in claim 4 wherein said input A and the end result Y are two's complement numbers of 2n bits between 4 and −4, and said numbers M, B and D are two's complement numbers of n bits between 2 and −2 sign, said number M being sign extended to 2n bits, including means for deriving from said result Y an n-bit output U sign extended over n bits for producing a result signal compatible with said input A, said deriving means passing only the most significant n bits of the result and extending the sign bit for n more bits, and further including n binary storage stages in the path of said result Y, whereby the result Y is delayed n bit cycles so that the delayed result Y is in synchronism with said output U.

7. A digital system as defined in claim 1, 2, 3, 4, 5 or 6 wherein said switching matrix is comprised of a communication control word register, decoders responsive to sections of said communication control word register for choosing elements in response to communication control words from said programmed digital computer, means for selectively connectively connecting one of said conductors for each chosen input of each chosen element, and means for selectively connecting one of said conductors for each chosen output of each chosen element.

8. In a digital multiplier comprised of a plurality of stages connected in series for bit serial multiplication of two numbers, logic means for one bit multiplication of a multiplicand M by a multiplier B, means for storing a carry, C, a three input adder for producing a one bit result $a_{i+1}$ and a carry by adding the result of the one bit multiplier logic means with the carry from the last bit result and the result $a_i$ from a preceding stage, or an input A in the case of the first stage which may be any number including zero, means in each stage for storing one bit of said multiplier, B, as said multiplier is entered serially with each multiplier bit of successively higher order stored in a separate stage of higher order, means for delaying said multiplicand, M, one bit in each stage as said multiplier is passed serially through said stages to perform the multiplication operation serially, each multiplicand bit being multiplied by every multiplier bit in sequence, and the results of the multiplications in each stage are added to the results of its preceding stage, and said logic means in each stage for one bit multiplication is comprised of a multiplexer controlled by a bit of said multiplicand, M, to select as an input to said adder a bit of said multiplier, B, or a bit of another number, D, and including means in each stage for storing one bit of said other number as said other number is entered serially with each multiplier bit of successively higher order stored in a stage of higher order, whereby linear interpolations between said multiplier and said other number is carried out with the same efficiency as multiplication with said multiplicand being the interpolation constant.

9. On a chip:
  an array of universal processing elements, each comprising pipelined means for computing at least $A+(B \times M)$, where B is a multiplier, M is a multiplicand and A is an input number to be added to the product $B \times M$, and
  a switching matrix for selectively connecting point to point universal processing elements, and for connecting multipliers, multiplicands and input numbers from an external source or other universal processing elements to selected universal processing elements said switching matrix comprising an array of parallel conductors on said chip including sets of conductors for interconnecting between groups of $2^n$ elements, where n is an integer equal to or greater than one that increases in increments of 1 until $2^n$ reaches the total number of elements on the chip.

10. The combination of claim 9 wherein each of said universal processing units comprises pipeline means for computing $A+[(B\times M)+Dx(1-M)]$ where B and D are n-bit two's complement numbers, and M and A are 2n-bit two's complement numbers.

11. The combination of
an array of universal processing elements, each comprising pipelined means for computing at least $A+(B\times M)$, where B is a multiplier, M is a multiplicant and A is an input number to be added to the product $B\times M$, and
a switching matrix for selectively connecting point to point universal processing elements, and for connecting multipliers, multiplicands and input numbers from an external source or other universal processing units to selected universal processing elements wherein said matrix comprises a plurality of conductors, some of which are available for selective connection to every universal processing unit, whereby the output of any one may be connected as an input to anay other, others of which are available only for connection among assigned groups of universal processing usnits, said matrix further comprising means for connections between adjacent universal processing units, each of said universal processing units comprises pipeline means for computing $A+[(B\times M)+D\times(1-M)]$ where B and D are n-bit two's complement numbers, and M and A are 2n-bit two's complement numbers, wherein each of n pipelined stages of each universal processing unit is comprised of an adder for computing the sum of A plus a Boolean logic function, $[b\cdot m+d\cdot\overline{m}]$, and a multiplexer responsive to the multiplicand for forming the function $[b\cdot m+d\cdot\overline{m}]$, where a, b, d and m are bits of the respective two's complement number A, B, D and M, whereby the entire array of stages in a universal processing unit computes $A+[B\times M+D\times(1-M)]$.

12. An array of n universal processing elements on a very large scale integrated circuit chip, where n is an integer greater than two, a switching matrix implemented on said chip for interconnecting in pairs selected ones of said elements point to point in response to control words, said matrix being comprised of parallel conductors which divide said array into selected groups of different sizes ranging from the smallest having more than one element but less than five elements, to the largest group consisting of all elements in the array for connecting said elements in pairs, whereby any one of said conductors may be selected in response to a control word for interconnecting any element in said group to another element in the same group, and a digital computer for generating said control words.

* * * * *